United States Patent [19]

Yao et al.

[11] Patent Number: 5,608,658
[45] Date of Patent: Mar. 4, 1997

[54] SYSTEM AND METHOD FOR INSPECTION OF PRODUCTS WITH WARRANTIES

[75] Inventors: David D. Yao, Yorktown Heights; Jinfa Chen; Shaohui Zheng, both of New York, all of N.Y.

[73] Assignee: The Trustees of Columbia University, New York, N.Y.

[21] Appl. No.: 513,297

[22] Filed: Aug. 10, 1995

Related U.S. Application Data

[63] Continuation of Ser. No. 263,537, Jun. 22, 1994, abandoned.
[51] Int. Cl.$^6$ .................................................. G06F 17/60
[52] U.S. Cl. .................................... 364/552; 395/210
[58] Field of Search ........................... 364/552, 554, 364/401, 402; 73/865.8

[56] References Cited

U.S. PATENT DOCUMENTS

| | | |
|---|---|---|
| 3,751,647 | 8/1973 | Maeder et al. ............... 235/151.11 |
| 4,131,472 | 12/1978 | MacDonald, Jr. et al. ............... 96/38.3 |

FOREIGN PATENT DOCUMENTS 0644422 10/1991 Japan .

OTHER PUBLICATIONS

Dept. of Defense, MIL–STD–105E, "Sampling Procedures and Tables for Inspection by Attributes", 10 May 1989.
Joseph M. Juran, *Quality Control Handbook*, McGraw–Hill Book Company, 1974, "Sampling by Attributes" Section 24.
Tapiero et al., "Quality Control and Product Servicing: A Decision Framework," *European Journal Operational Research*, vol. 39, 1989, pp. 261–273.
Lie et al., "Optimum Single–Sample Inspection Plans for Products Sold Under Free and Rebate Warranty," *IEEE Transactions on Reliability*, vol. R–36, No. 5, Dec. 1987, pp. 634–637.
Murthy et al., "Optimal Development Testing Policies for Products Sold with Warranty," *Reliability Engineering*, vol. 19, 1987, pp. 113–123.
Nguyen et al., "An Optimal Policy for Servicing Warranty," *J. Opl. Res. Soc.*, vol. 37, 1986, pp. 1081–1088.
Thomas, "Optimum Warranty Policies for Nonreparable Items," *IEEE Transactions on Reliability*, vol. R–32, No. 3, Aug. 1983, pp. 282–288.
Mamer, "Discounted and Per Unit Costs of Product Warranty," *Management Science*, vol. 33, No. 7, Jul. 1987, pp. 916–930.
Singpurwalla et al., "The Warranty Problem: Its Statistical and Game Theoretic Aspects," *SIAM Review*, vol. 35, No. 1, Mar. 1993, pp. 17–42.
Blischke, "Mathematical Models for Analysis of Warranty Policies," *Mathl Comput. Modelling*, vol. 13, No. 7, 1990, pp. 1–16.

*Primary Examiner*—Ellis B. Ramirez
*Assistant Examiner*—Eric W. Stamber
*Attorney, Agent, or Firm*—Brumbaugh, Graves, Donohue & Raymond

[57] ABSTRACT

A batch of units of a product are inspected before they are supplied to customers with warranties. The units are either defective or non-defective, realizing a defect index which is a random variable characterized by a statistical distribution. During the inspection, the units identified as being defective are repaired. A dynamic inspection technique has been developed and can be used to identify different thresholds for which number of units within a batch need to be inspected, such that costs due to the inspection, repair and warranty are minimized.

8 Claims, 3 Drawing Sheets

SYSTEM AND METHOD FOR INSPECTION OF PRODUCTS WITH WARRANTIES

The U.S. Government has certain rights in this invention pursuant to award DDM-91-08540 by National Science Foundation.

This application is a continuation of application Ser. No. 08/263,537, filed on Jun. 22, 1994 now abandoned.

TECHNICAL FIELD

This invention relates to quality control of finished products, and particularly to a technique for inspection of these products before their delivery to customers with warranties.

BACKGROUND OF THE INVENTION

A manufacturer of a product sold with a warranty normally provides service, replacement or, in some cases, a refund to a customer when the product becomes defective within a warranty period. Such service, replacement or a refund under the warranty incurs a warranty cost.

Warranties come in different types. The most common type is the so-called "individual warranty," whereby each product unit is individually warranted for a specified period. By contrast, a cumulative warranty covers a batch of units as a whole, and the warranty period applies to the entire batch. Such a cumulative warranty is normally used to cover reliability systems wherein system components are readily replaceable with spare parts.

Thus, for a product sold with a warranty, quality control is important in the manufacturing process to reduce the warranty cost. To this end, before units of the product generally grouped in batches are delivered to customers, the manufacturer normally performs an inspection to ensure their quality.

A typical inspection is conducted based on a known defect ratio $\Theta$, defined as a proportion of defective units within a batch. This defect ratio may be derived from historical data and/or knowledge about the manufacturing process. Taking into account cost factors such as inspection, repair and warranty costs, the manufacturer makes a decision whether to inspect the whole batch or not to inspect at all. It is apparent that the decision would favor an inspection when $\Theta$ is relatively high and the inspection and repair costs are relatively low. According to C. Tapiero et al., "Quality Control and Product Servicing: A Decision Framework," *European Journal Operational Research*, vol. 39, 1989, pp. 261–273, when $\Theta$ is deterministically known for the batch under inspection, the 0 or 100% inspection rule is optimal in the case where an individual warranty for example is extended. However, in practice the $\theta$ value derived from the historical data may bear slight relevance to each particular batch, thus leading to a faulty decision whether to inspect or not.

What complicates the matter is that the defect ratio $\Theta$ is oftentimes a random variable and thus undeterministically known. That is, $\Theta$ may only be realized as a statistical distribution, in which case Tapiero suggests a partial inspection. A typical partial inspection calls for examination of sample units from a batch. Depending on the number of defective units identified within the sample units, the manufacturer decides whether to reject or accept the entire batch. However, the success of this procedure requires an impeccable choice of the sample size. If the sample size is too small, the procedure becomes unreliable. On the other hand, if the size is too large, the procedure becomes unjustifiably expensive.

Accordingly, it is desirable to have a cost-effective methodology for inspection of finished products sold with warranties even though their defect ratios are undeterministic.

SUMMARY OF THE INVENTION

The present invention overcomes the prior art limitations and affords a cost-effective technique for inspection of finished products having undeterministic defect ratios. In accordance with the invention, lower and upper bounds for number of inspected units in a batch are defined. A selected number of units in a batch are tested, where the selected number is at least equal to the lower bound but not greater than the upper bound. Through the testing, a subset of the tested units in the batch is identified as being defective. A plurality of benchmark values are defined, and each benchmark value is associated with a different number of tested units. A conclusion of inspection of the batch is determined based on a result of a comparison of (a) number of defective units in the subset with (b) the benchmark value associated with the selected number of tested units.

By incrementing the selected number of tested units each time up to the upper bound whenever the inspection is determined to be unfinished, a sequential quality inspection routine is thus realized. Advantageously, such an inspection routine applies to finished products sold with a wide variety of warranty types, and enables one to minimize inspection, repair and warranty costs.

BRIEF DESCRIPTION OF THE DRAWING

Further objects, features and advantages of the invention will become apparent from the following detailed description taken in conjunction with the accompanying drawing showing a preferred embodiment of the invention, in which.

Throughout the figures of the drawing, the same reference numerals and characters are used to denote like features, elements, components or portions of the illustrated embodiment.

DETAILED DESCRIPTION

Figure 1:
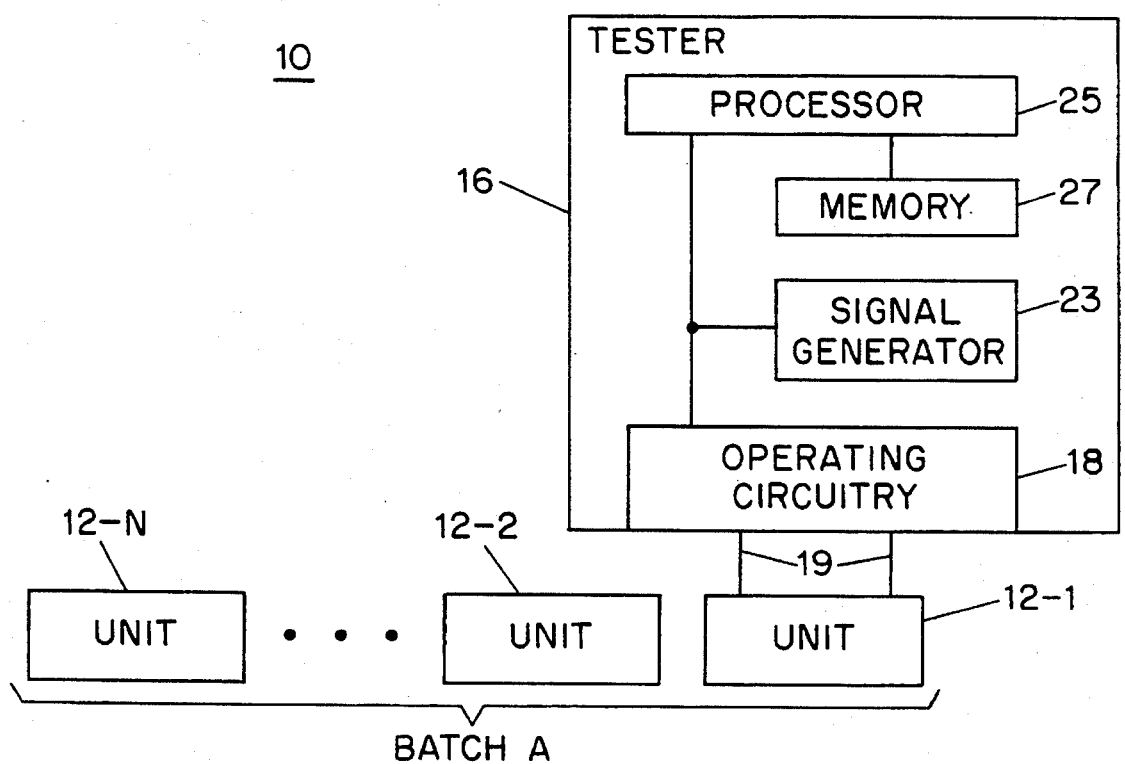
FIG. 1 illustrates a system for inspecting products in accordance with the invention.

FIG. 1 illustrates inspection system 10 embodying the principles of the invention. System 10 is designed to inspect a finished product which in this instance is a conventional electrical device. As shown in FIG. 1, batch A of the product currently under inspection consists of N units numerically denoted 12-1 through 12-N, where N is a predetermined integer greater than 1. Without loss of generality, batch A after passing the inspection will be delivered to customers with a cumulative warranty. Unlike an individual warranty which covers an individual unit, a cumulative warranty covers a batch as a whole.

In this illustrative embodiment, units of the finished product identified by system 10 as being defective would be repaired. Thus, if system 10 performs a 100% inspection (i.e., inspection of each unit), virtually all the N units in the batch should be in a non-defective condition when it is delivered. However, inspection and repair do not come from vacuum, and are normally realized at the expense of the production capacity. As such, 100% inspection is generally not feasible.

In accordance with the invention, system 10 performs a sequential inspection to ensure the quality of the finished product, and operates in such a way that the total costs resulting from the inspection, repair and warranty are minimized. Illustratively, the inspection and repair costs here are $c_i$ and $c_r$ per unit, respectively. The warranty cost, and the sequential inspection in accordance with the invention are fully described hereinbelow.

Like other manufactured products in general, the finished product inspected by system 10 has an undeterministic defect ratio ($\Theta$) or proportion of defective units to good units within a batch. That is, $\Theta$ is a random variable and can only be represented as a statistical distribution. $\Theta$ in general is greater than or equal to $\theta_0$ but less than or equal to $\theta_1$, where $\theta_0$ and $\theta_1$ are predetermined constants. The lifetimes of defective and non-defective units are also random variables and realized as individual statistical distributions. However, the sequential inspection technique in accordance with the invention applies regardless of the actual forms of the above statistical distributions.

Inspection by system 10 can be imperfect in that defective units can be identified with less than a 100% reliability. However, in practice, non-defective units would not be misidentified as being defective. Any defective units, as found by the inspection process, would be repaired before they are returned to the batch from which they come. Nonetheless, the repairs can be imperfect in that they may not entirely eliminate the defects, but the repairs do not exacerbate the defects.

As shown in FIG. 1, units of batch A are transported in a sequential manner to tester 16 for inspection. Tester 16 comprises operating circuitry 18 of conventional design which includes a plurality of probes 19 to test the units at particular points thereof. In a well-known manner, probes 19 communicates diagnostic signals to processor 25 of conventional design during testing of each unit. In response to these signals, processor 25 determines whether the unit under inspection is defective. In the event that it is defective, processor 25 triggers signal generator 23 within circuitry 18 to indicate its defective condition. Signal generator 23 comprises an indicator (not shown) capable of generating a visual and/or audible signal when generator 23 is triggered. The unit that are identified as being defective are removed from the batch and repaired. The repaired unit is then returned to the batch from where it came.

It should be pointed out that in this instance tester 16 is relatively expensive with respect to the product under inspection. For economic reasons, the manufacturer has only a few such testers for inspecting a much larger quantity of the product units, and it is impractical for the manufacturer to inspect each unit.

The activities of the operating circuitry 18 are orchestrated by processor 25 in accordance with software programs. These programs are stored in memory 27 which may be a conventional programmable read-only-memory (PROM). One of the programs is an initialization routine for establishing certain parameters. These parameters include two integers $n_0^*$ and $n_1^*$, where $0 \leq n_0^* \leq n_1^* \leq N$; and a sequence of integers $d_0^*$ through $d_{n_1}^*$ termed "benchmarks", where $d_0^* \leq \ldots \leq d_{n_1}^* - 1$.

In accordance with the invention, the two integers $n_0^*$ and $n_1^*$ respectively define the lower and upper bounds of the number of units that need to be inspected in a batch. In other words, in accordance with the invention one needs to inspect at least $n_0^*$ units but no more than $n_1^*$ units in a batch. The benchmarks provide some level of quality assurance to the batch. For instance, if the number of defective units identified after testing a total of n units in a particular batch is less than the corresponding benchmark $d_n$, the quality of such a batch is regarded satisfactory, and no further inspection is carried out. Otherwise, the inspection continues.

The aforementioned imperfections of the inspection and repair processes would be reflected in the respective values of the above parameters. For instance, if the imperfections in the inspection and repair processes are high, the value of $n_0^*$ tends to be low, while the values of $d_n$'s tend to be high. As a result, the inspection and repair procedure in accordance with the invention calls for an early conclusion of the procedure, or even no inspection and repair at all.

The derivation of the above parameters requires formulation of a warranty cost. Although the warranty here is of the type of the cumulative warranty, the warranty cost takes the general form of a function C(T), where T represents the sum of lifetimes of the units in the batch.

Thus, for example, if X and Y are random variables representative of lifetimes of non-defective and defective units in batch A, respectively, and Z is a random variable representative of the lifetime of a unit in the batch without inspection, Z would equal Y with a probability of $\Theta$ and X with a probability of $1-\Theta$. Accordingly, without inspection, the expected warranty cost can be generalized as $$E\left[ C\left( \sum_{j=1}^{N} Z_j \right) \right],$$

where the subscript j indicates that the lifetime, $Z_j$, is that of the $j^{th}$ unit; $E[*]$ is a standard mathematical operation yielding an expected value of the argument *. On the other hand, with inspection of n units, the generalized expected warranty cost W(n) becomes $E[C(X_1 + \ldots + X_n + Z_{n+1} + \ldots + Z_N)]$. In fact, the above expression for the expected warranty cost function is general enough to accommodate a wide variety of warranties in commercial use. For example, in the case of an individual warranty, the generalized expected warranty cost becomes an additive function: $E[C(Z_1)] + \ldots + E[C(Z_N)]$.

In this instance, the only requirements for the generalized expected warranty cost function is that it is decreasing and convex. Such requirements are reasonable in that as the lifetimes of the units increase, the warranty cost for the units decreases, with a decreasing margin reflecting the depreciation in the product's value over time. In the special case of the individual warranty, the only restriction for the function is that it is always decreasing.

Figure 2:
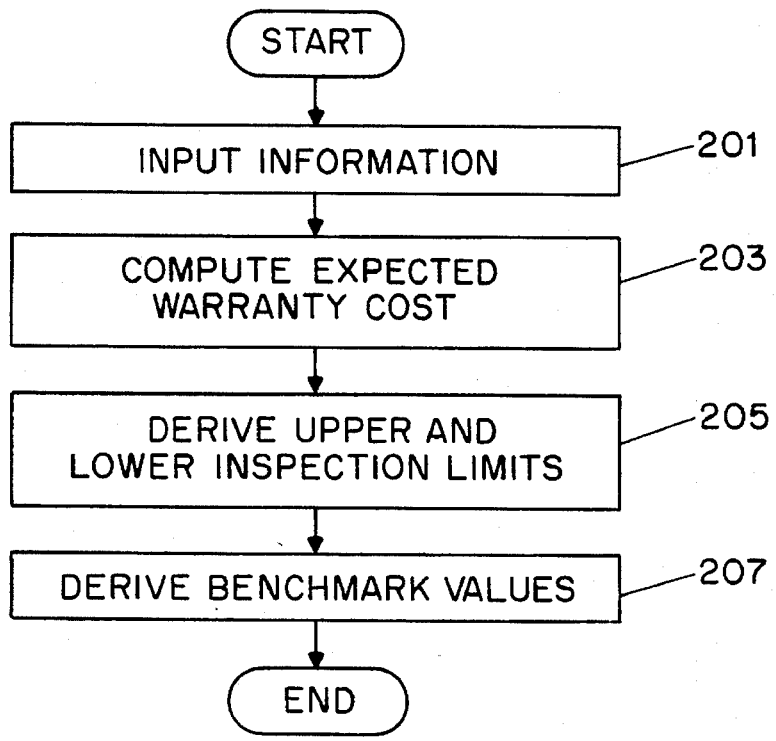
FIG. 2 is a flow chart depicting an initialization routine for establishing certain parameters used in the system of FIG. 1.

The initialization routine stored in memory 27 will now be described. FIG. 2 is a flow chart depicting the steps of such a routine. Under the instructions of the initialization routine, processor 25 at step 201 inputs necessary information including number of units in a batch (N), a unit inspection cost ($c_i$), a unit repair cost ($c_r$), a warranty cost function (C(T)), statistical distribution data for the respective lifetimes of non-defective units (X) and defective units (Y), and statistical data for the defect ratio ($\Theta$) characterized by its probability density function $f_\Theta$. At step 203, processor 25 computes the expected warranty cost W(n) based on the foregoing input information entered at step 201 for n=0, 1, . . . ,N, where $W(n)=E[C(X_1+X_2+X_3+\ldots+X_n+Y_{n+1}+\ldots+Y_N)]$. It is important to note that each computation of W(n) involves convolution of N random variables. Such a computation may be achieved in a well-known manner using a fast Fourier transform (FFT), or an approximation approach via normal distributions.

At step 205 processor 25 derives $n_0^*$ and $n_1^*$, where $$n_0^*=\min_n \Pi(n, \theta_0), \text{ and}$$

$$n_1^*=\min_n \Pi(n, \theta_1),$$

for n=0,1, . . . , N, where $$\Pi(n,\theta)=C_i n+C_r n\theta+\phi(n,\theta), \text{ and}$$

$$\Pi(n,\theta) = C_i n + C_r n\theta + \phi(n,\theta), \text{ and}$$

$$\phi(n,\theta) = \sum_{k=0}^{N-n} W(n+k)\binom{N-n}{k}\theta^k(1-\theta)^{N-n-k}$$

At step 207, processor 25 derives the benchmark values $d_n$, for $n=n_0^*, \ldots, n_1^*-1$. This derivation involves the following computations:

$$d_n=\min\{d \leq n: \psi_n(d) < \Phi_n(d)\},$$

where: for $n=0,1, \ldots, n_1^*-1$ and $d=0,1, \ldots, n$, $$\Phi_n(d) = \int_{\theta_0}^{\theta_1} \phi(n,\theta) f_{\Theta_n(d)}(\theta) d\theta, \text{ and} \tag{1}$$

$$f_{\Theta_n(d)}(\theta) = \theta^d(1-\theta)^{n-d} f_\Theta(\theta)/E[\Theta^d(1-\Theta)^{n-d}]; \tag{1a}$$

for $n=n_1^*-1, \ldots, 1, 0$; and $d=0, 1, \ldots, n$, $$\psi_n(d)=c_i+[c_r+V_{n+1}(d+1)]R_n(d)+V_{n+1}(d)[1-R_n(d)], \tag{2}$$

$$R_n(d)=E[\Theta^{d+1}(1-\Theta)^{n-d}]/E[\Theta^d(1-\Theta)^{n-d}]. \tag{2a}$$

$$V_n(d)=\min\{\Phi_n(d), \psi_n(d)\}, \text{ and} \tag{2b}$$

$$V_{n_1}^*(d)=\Phi_{n_1}^*(d), \text{ for } d=0,1, \ldots, n_1^*. \tag{2c}$$

Figure 3:
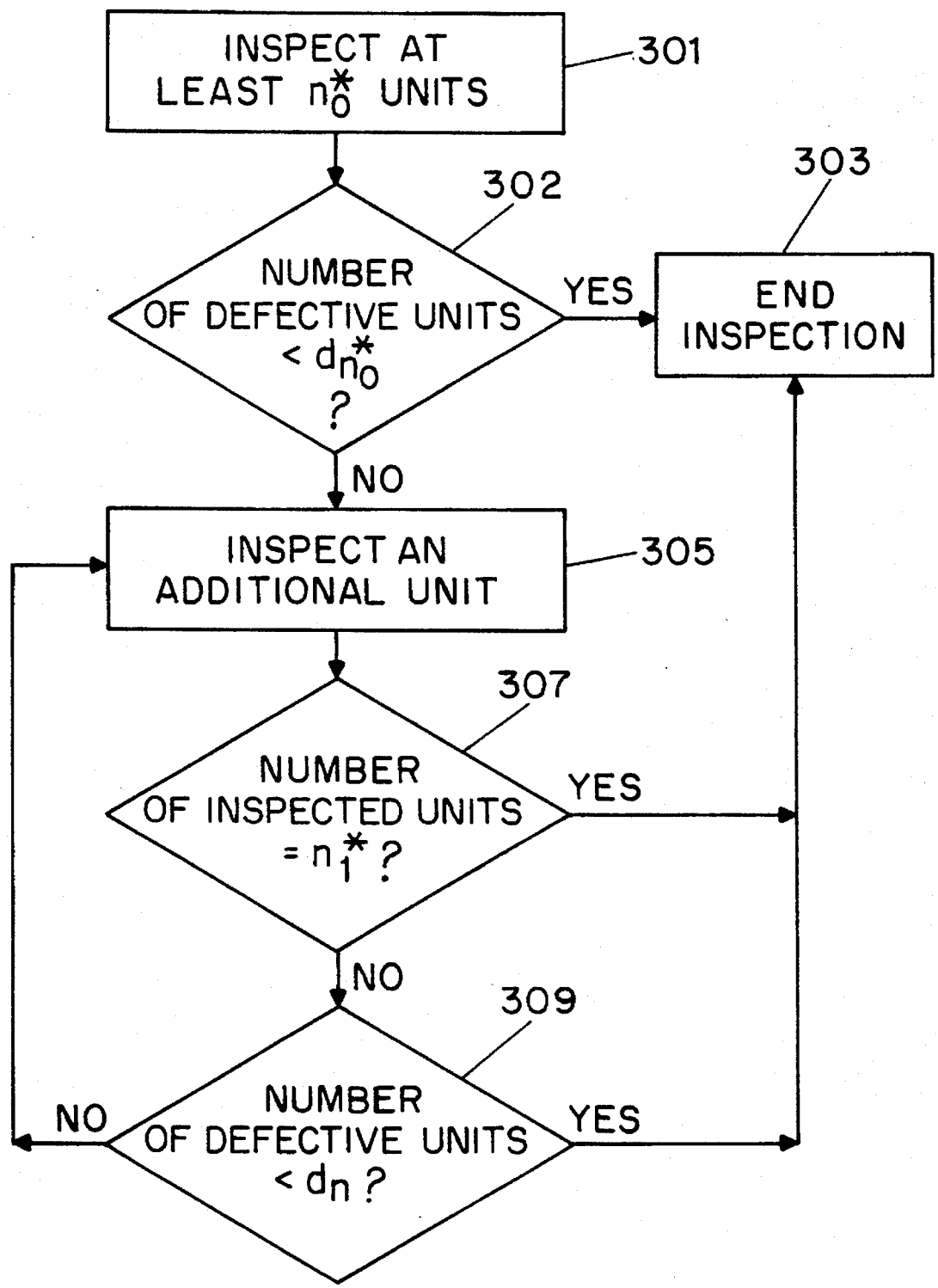
FIG. 3 is a flow chart depicting a general inspection routine carried out by the system of FIG. 1.

The sequential inspection routine in accordance with the invention which is stored in memory 27 will now be described. FIG. 3 is a flow chart depicting the steps of the inspection routine. Instructed by such a routine, processor 25 causes operating circuitry 18 to test at least a sample of $n_0^*$ units in batch A, as indicated at step 301. At step 302, processor 25 determines whether the total number of defective units identified is smaller than the corresponding benchmark $d_{n_0^*}$ defined in the above initialization routine. If it is smaller, processor 25 proceeds to step 303 where it indicates by a visual and/or audible signal that the inspection of batch A comes to an end. That is, batch A will be ready for delivery as soon as the identified defective units are repaired. Otherwise if the number of defective units is not smaller, processor 25 causes operating circuitry 18 to continue the inspection and test an additional unit from the batch, as indicated at step 305. Processor 25 then proceeds to step 307 where it determines whether the total number of inspected units equals $n_1^*$. If it equals $n_1^*$, processor 25 proceeds to step 303 and again the routine ends. Otherwise, processor 25 proceeds to step 309 where processor 25 further determines whether the cumulative number of defective units identified is smaller than the benchmark $d_n$ corresponding to the number of units (n) inspected thus far. If it is smaller, processor 25 proceeds to step 303. Otherwise, it returns to step 305.

Figure 4:
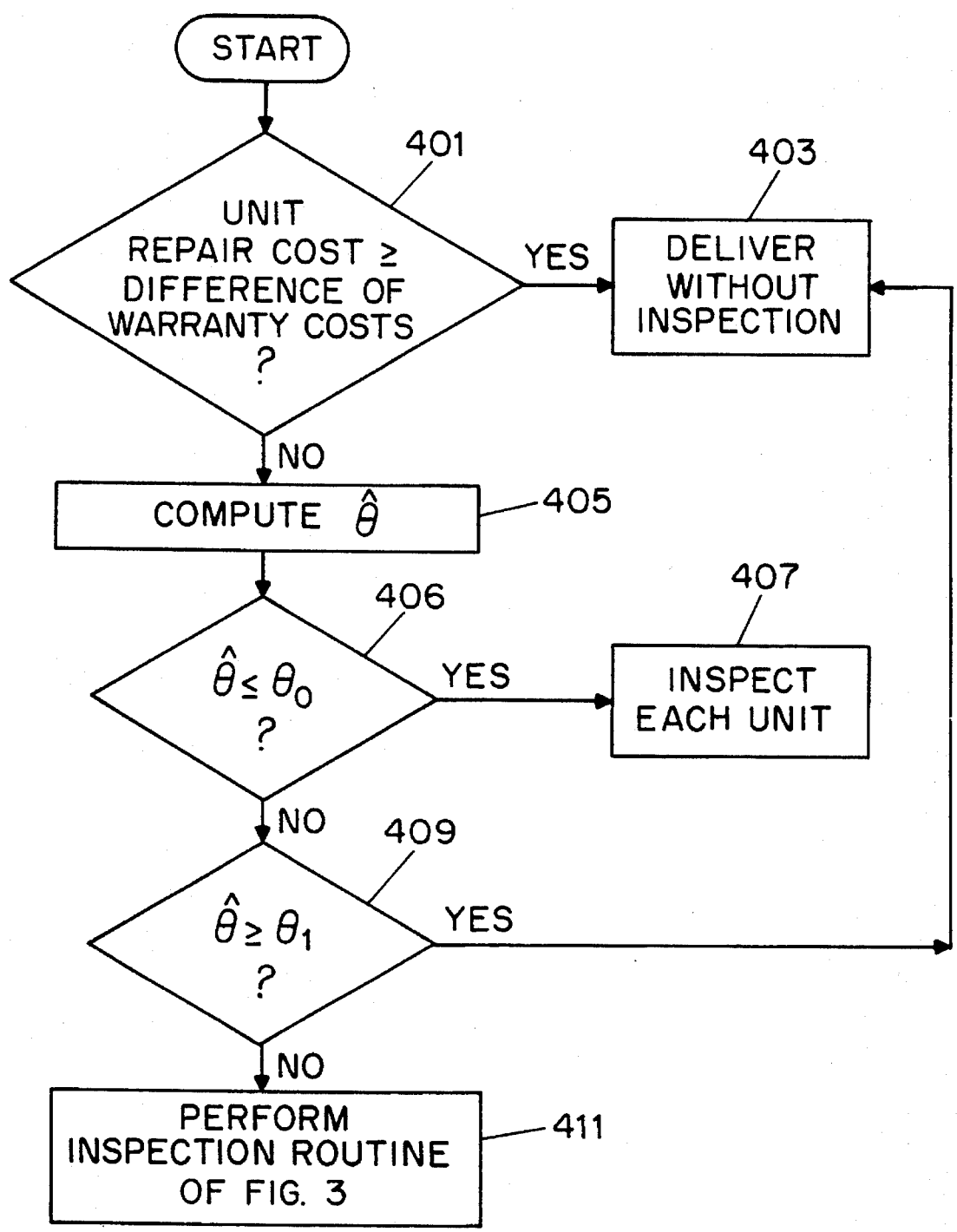
FIG. 4 is a flow chart depicting a particular inspection routine for products sold with individual warranties in accordance with the invention.

The above embodiment is generally for inspection of finished products with warranties, e.g., cumulative warranties. In a particular case where individual warranties are utilized, the warranty cost function C(T) as mentioned before takes an additive form. As a result, it can be shown that the sequential inspection routine in accordance with the invention and the related computations are significantly simplified. FIG. 4 is a flow chart illustrating the steps of the resulting routine. At step 401, the unit repair cost ($c_r$) is compared with the difference between the expected warranty costs of a defective unit and a non-defective unit (i.e., E[C(Y)]−E[C(X)]). If $c_r \geq E[C(Y)]-E[C(X)]$, the batch is delivered without inspection, as indicated at step 403. Otherwise, at step 405 compute $\hat{\theta}$ which equals $c_r/\{E[C(Y)]-E[C(X)]-c_r\}$. At step 406, $\hat{\theta}$ is compared with $\theta_0$. If $\hat{\theta} \leq \theta_0$, each of the N units in the batch is inspected, as indicated at step 407. Otherwise $\hat{\theta}$ is compared with $\theta_1$, as indicated at step 409. If $\hat{\theta} \geq \theta_1$, the routine proceeds to step 403 where again the batch is delivered without inspection; but otherwise if $\theta_0 < \hat{\theta} < \theta_1$, the inspection routine of FIG. 3 is performed, as indicated at step 411. However, the initialization routine associated with the inspection routine in this particular case is simpler than that of FIG. 2. This simplified initialization routine is identical to that of FIG. 2 except for step 207 where the benchmark values are derived. Specifically, $\Phi_n(d)$ necessary for determination of the benchmark values no longer needs to be as complicatedly defined as above formula (1) in this case, but instead can simply be defined as follows:

$$\Phi_n(d)=NE[C(X)]+(N-n)R_n(d)\{E[C(Y)]-E[C(X)]\},$$

where $R_n(d)$ is set forth as above formula 2(a).

The foregoing merely illustrates the principles of the invention. It will thus be appreciated that those skilled in the art will be able to devise numerous arrangements which, although not explicitly shown or described herein, embody the principles of the invention and are thus within its spirit and scope.

For example, each of the lifetime random variables, X and Y, in the disclosed embodiment may be replaced by a random vector having a multiplicity of elements to model so-called "multi-dimensional warranties." That is, in addition to time, other dimensions may be used to measure the extent of exploitation of a product, e.g., mileage in the case of an automobile. Thus, for instance, with a two-dimensional warranty, an automobile may be warranted for the first six years of its life or sixty thousand miles thereof, whichever expires earlier.

In addition, it will be appreciated that a person skilled in the art will incorporate additional quality measures into the present inspection routine. For instance, the proportion of defective units in a batch may be required not to exceed a given limit α. This constraint can be expressed as follows:

$$\left(1-\frac{n}{N}\right)E[\Theta_n(d)] \leq \alpha.$$

The incorporation of the above constraint simply calls for its consideration as an additional criterion in deciding at each stage n whether to stop or continue the inspection.

Moreover, the disclosed inspection routine may be applicable to a multi-stage production. Based on the disclosed routine, a person skilled in the art will be able to devise a quality control procedure for a two-stage production for example, where an upstream production stage feeds finished units into a downstream stage. In this setting, the aforementioned X and Y random variables (or vectors) may represent quality measures in other dimensions than just the lifetimes of the units, and C(T) may represent penalties concomitant to substandard units such as costs of rework for such units.

We claim:

1. Apparatus for inspecting a batch of units of a product to be delivered under a warranty comprising:

a processor for computing a limiting number;

a testing device for testing a selected number of units in said batch, and for determining the number of defective units in said selected number of units, said selected number of units being smaller than said limiting number, said limiting number being substantially equal to the number of units tested yielding the smallest value of a first cost, including the testing cost of the number of units, the repair cost of the number of units weighted by a predetermined defect ratio and the expected warranty cost of the batch if the testing is terminated after the number of units are tested;

said processor including a counter for increasing the value of said selected number of units by one, and a generator for generating a respective threshold value corresponding to each value of said selected number of units tested, said respective threshold value corresponding to each selected number of units tested being substantially equal to the smallest number of units found to be defective in the selected number of units tested, such that a second cost, including the testing cost of an additional unit, the repair cost of the additional unit weighted by the probability that the additional unit will be found defective and an expected overall testing, repair and warranty cost of the batch that results from testing the additional unit, is less than the expected warranty cost of the batch if testing is terminated after the selected number of units are tested; and a test controller for terminating testing of said batch if the number of defective units in said selected number of units is smaller than said threshold value corresponding to the value of said selected number of units, said test controller causing said counter to increase the value of said selected number of units by one when the number of defective units is equal to or greater than said threshold value corresponding to the value of said selected number of units, said test controller terminating testing of the batch if the increased value of said selected number of units is equal to or greater than said limiting number, and said test controller causing said test device to test a previously untested unit when the increased value of said selected number of units is smaller than said limiting number.

2. The apparatus of claim 1 wherein each unit which has been determined defective in said batch is repaired, said batch being delivered without further inspection.

3. The apparatus of claim 1 wherein said warranty is a cumulative warranty for said batch.

4. The apparatus of claim 1 wherein said warranty is an individual warranty for a different one of said units.

5. A method for inspecting a batch of units of a product to be delivered with a warranty, comprising the steps of:

generating a limiting number;

testing a selected number of units in said batch, said testing step including the step of determining the number of defective units in said selected number of units, said selected number of units being not greater than said limiting number, said limiting number being substantially equal to the number of units tested yielding the smallest value of a first cost, including the testing cost of the number of units, the repair cost of the number of units weighted by a predetermined defect ratio, and the expected warranty cost of the batch if the testing is terminated after the number of units are tested, given the predetermined defect ratio;

generating a respective threshold value corresponding to each value of said selected number of units tested, said respective threshold value corresponding to each selected number of units tested being substantially equal to the smallest number of units found to be defective in the selected number of units tested, such that a second cost, including the testing cost of an additional unit, the repair cost of the additional unit weighted by the probability that the additional unit will be found defective and an expected overall testing, repair and warranty cost of the batch that results from testing the additional unit, is less than the expected warranty cost of the batch if testing is terminated after the selected number of units are tested;

comparing said number of defective units in said selected number of units with said threshold value corresponding thereto;

terminating said testing of said selected number of units in said batch if the number of defective units in said selected number of units is less than said threshold value corresponding to the value of said selected number of units;

increasing the value of said selected number of units in said batch by one when the number of defective units is equal to or greater than said threshold value corresponding to the value of said selected number of units;

terminating testing of the batch if the increased value of said selected number of units is equal to or greater than said limiting number; and testing a previously untested unit if the increased value of said selected number of units is smaller than said limiting number.

6. The method of claim 5 wherein each unit which has been determined defective in said batch is repaired, said batch being delivered without further inspection.

7. The method of claim 5 wherein said warranty is a cumulative warranty for said batch.

8. The method of claim 5 wherein said warranty is an individual warranty for a different one of said units.

* * * * *

UNITED STATES PATENT AND TRADEMARK OFFICE
CERTIFICATE OF CORRECTION

PATENT NO. : 5,608,658
DATED : March 4, 1997
INVENTOR(S) : David D. Yao, et. al.

It is certified that error appears in the above-identified patent and that said Letters Patent is hereby corrected as shown below:

Column 3, line 44, "communicates" should read -- communicate--; line 52, "The unit" should read -- The units --. Column 4, line 39, "Z;," should read -- $Z_j$ --; line 51, "is that" should read-- are that --. Column 5, delete line 17 (duplicate of next line).

Signed and Sealed this

Sixteenth Day of December, 1997

Attest:

BRUCE LEHMAN

Attesting Officer    Commissioner of Patents and Trademarks